US008310483B2

(12) United States Patent
Cooper et al.

(10) Patent No.: US 8,310,483 B2
(45) Date of Patent: Nov. 13, 2012

(54) TINTING A SURFACE TO SIMULATE A VISUAL EFFECT IN A COMPUTER GENERATED SCENE

(75) Inventors: Douglas W. Cooper, Glendale, CA (US); Ben H. Kwa, Pasadena, CA (US)

(73) Assignee: Dreamworks Animation LLC, Glendale, CA (US)

( * ) Notice: Subject to any disclaimer, the term of this patent is extended or adjusted under 35 U.S.C. 154(b) by 1380 days.

(21) Appl. No.: 11/943,415

(22) Filed: Nov. 20, 2007

(65) Prior Publication Data

US 2009/0128561 A1 May 21, 2009

(51) Int. Cl.
*G06T 15/50* (2011.01)
(52) U.S. Cl. ........................................ 345/426; 345/419
(58) Field of Classification Search .................. None
See application file for complete search history.

(56) References Cited

U.S. PATENT DOCUMENTS

| | | | | |
|---|---|---|---|---|
| 5,611,036 | A * | 3/1997 | Berend et al. | 345/441 |
| 6,292,167 | B1 * | 9/2001 | Throup | 345/589 |
| 6,532,013 | B1 * | 3/2003 | Papakipos et al. | 345/426 |
| 6,567,096 | B1 | 5/2003 | Oka et al. | |
| 7,155,068 | B2 * | 12/2006 | Zhang et al. | 382/284 |
| 7,623,137 | B1 * | 11/2009 | Miller | 345/592 |
| 2003/0123713 | A1 * | 7/2003 | Geng | 382/118 |
| 2006/0197773 | A1 * | 9/2006 | Kraemer | 345/582 |
| 2007/0085849 | A1 * | 4/2007 | Kosolapov | 345/419 |

FOREIGN PATENT DOCUMENTS
WO  2007/005739 A2  1/2007

OTHER PUBLICATIONS

Extended European Search Report received for EP Patent Application No. 08253780.4, mailed on Apr. 29, 2010. 10 pages.
Haro et al., "Visual Acuity in Day for Night", International Journal of Computer Vision, vol. 69, No. 1, Apr. 2006, pp. 109-117.
Jensen et al., "Night Rendering", Technical Report UUCS-00-016, Computer Science Department, University of Utah, Aug. 2000, pp. 1-10.
Thompson et al., "A Spatial Post-Processing Algorithm for Images of Night Scenes", Journal of Graphics Tools, vol. 7, No. 1, Nov. 2002, pp. 1-11.
Joblove, G. H. et al. (Aug. 1978). "Color Spaces for Computer Graphics," *ACM SIGGRAPH Computer Graphics* 12(3):20-25.
Nicodemus, F. E. (Jul. 1965). "Directional Reflectance and Emissivity of an Opaque Surface," *Applied Optics* 4(7): 767-773.
Office Action received for European Patent Application No. 08253780.4, mailed on Jan. 7, 2011, 5 pages.

* cited by examiner

*Primary Examiner* — Said Broome
(74) *Attorney, Agent, or Firm* — Morrison & Foerster LLP (57) ABSTRACT

A tinted color value is produced for a surface of an object in a computer generated scene. The surface is illuminated by a light source having a lighting color value associated with the light source. A first reflected color value is calculated for the surface. The first reflected color value is calculated based on an assumption that the surface is illuminated by white light rather than the lighting color value associated with the light source. A desaturated color value is computed using the first reflected color value. A tinted color value is computed by combining the desaturated color value with the lighting color value associated with the light source. The tinted color value is stored.

11 Claims, 7 Drawing Sheets

TINTING A SURFACE TO SIMULATE A VISUAL EFFECT IN A COMPUTER GENERATED SCENE

BACKGROUND

1. Field

The present application generally relates to computer generated graphics, and, more particularly, to tinting a surface to simulate a visual effect in a computer generated scene.

2. Related Art

Techniques commonly known as computer generated imaging (CGI) can be used to simulate a broad range of digital environments including visual effects, characters or entire scenes in a digital cinematographic production. Typically computer generated objects are created using a modeling technique giving the appearance of physical objects in a computer generated scene. The computer generated objects can be manipulated digitally to tell a story or represent some visual effect. Such modeling techniques are commonly used in areas such as graphic arts, computer games and cinematographic production.

In order to produce realistic images and effects, computer generated scenes are often rendered using one or more simulated light sources. Image rendering simulates the complex physical interactions between light and surfaces of objects in a scene using mathematical techniques sometimes referred to as shaders. When using a shader, optical phenomena such as diffuse and specular reflection, and surface texture are simulated using a bidirectional reflectance distribution function (BRDF). Using various factors, such as the geometry of a planer surface, the location and color of a light source, surface properties and the location of the receiving camera or eye, a BRDF can be used to simulate how a surface would appear in an actual physical environment. The degree of realism in a computer graphics image is largely dependant on the modeling accuracy and complexity of the shaders. Many computer rendering processes use multiple shaders to achieve a photo-realistic result.

In addition to producing a realistic image, a rendering process can be used to produce certain visual effects. As one example, low lighting conditions can be simulated in a computer generated scene through the use of lighting sources with a primarily blue color or hue. The human eye processes light in a different way in low lighting conditions. Sometimes referred to as a scotopic effect, the rod sensors in the eye dominate over cone sensors in low lighting conditions. Thus, low light vision tends to be monochromatic, and a color shift may be perceived. However, there are certain problems that arise when simulating this scotopic effect in a computer generated scene. Because a "night" light source is composed of primarily blue colors, red objects appear faint or not visible at all. This is due to the fact that the aforementioned BRDF mimics physical light properties by "absorbing" the incident blue light and reflecting little or no red light to the observer. This effect is most pronounced when the lighting color and the object color are two different highly saturated primary colors (such as blue and red).

To produce certain visual effects, a rendering process can use multiple surfaces to represent a single object. Using this technique, one surface with the original object color can be used in one lighting condition, and another surface representing the same object with a different color can be used for another lighting condition. While this technique can achieve the desired visual effects, the use of multiple surfaces substantially increases the complexity of the model and creates a significant amount of work at various stages of a production process.

SUMMARY

In one exemplary embodiment, a tinted color value is produced for a surface of an object in a computer generated scene. The surface is illuminated by a light source having a lighting color value associated with the light source. A first reflected color value is calculated for the surface. The first reflected color value is calculated based on an assumption that the surface is illuminated by white light rather than the lighting color value associated with the light source. A desaturated color value is computed using the first reflected color value. A tinted color value is computed by combining the desaturated color value with the lighting color value associated with the light source. The tinted color value is stored.

DETAILED DESCRIPTION

The following description sets forth numerous specific configurations, parameters and the like. It should be recognized, however, that such description is not intended as a limitation on the scope of the present invention, but is instead provided as a description of exemplary embodiments.

1. Rendering a Computer Generated Scene

The exemplary embodiments described below relate to the process of rendering a computer generated scene as a computer generated image. The process is often referred to as "rendering a scene" and is performed as a step in computer animation or other process requiring realistic computer imagery.

Figure 1:
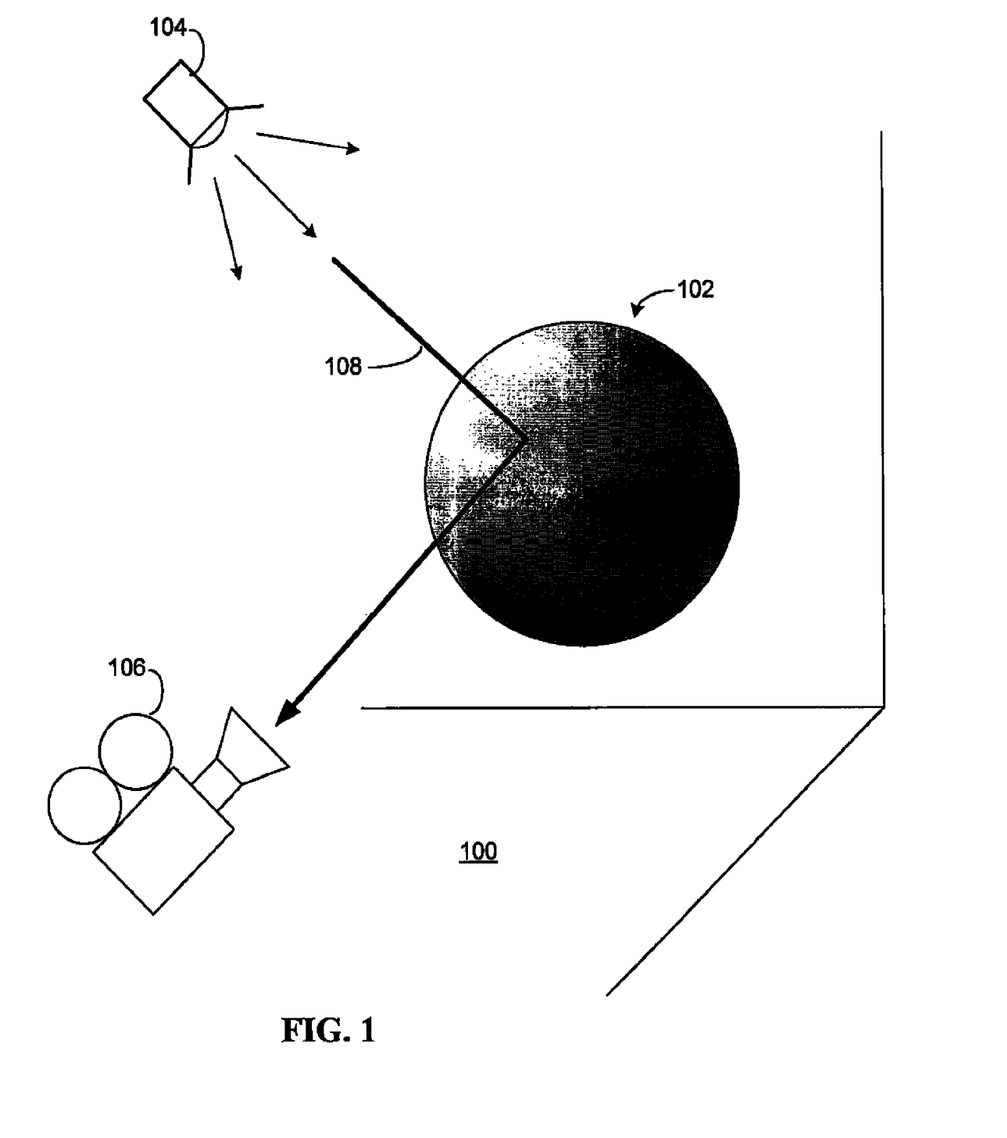
FIGS. 1 and 2 depict an exemplary computer generated scene.

As illustrated in FIG. 1, an exemplary computer generated scene 100 can include an object 102, a computer modeled light source 104, and a scene observer viewpoint 106, which is analogous to a photographic or cinematographic camera. It should be recognized that scene 100 can include any number of objects of various shapes and characteristics.

Light source 104 is modeled as producing a beam of light 108, which illuminates object 102. In some embodiments, beam of light 108 can be modeled as a broad spectrum light source, such as a white light. Alternatively, in other embodiments, beam of light 108 can be modeled as a narrow spectrum light source related to a specific color. For example, as described above, to simulate low lighting conditions, light source 104 can be modeled as having a primarily blue color or hue. It should be recognized, however, that light source 104 can be modeled as having various colors and/or hues.

Various techniques for modeling light source 104, such as spot lighting or directional positioning, may be used to obtain certain effects visible at viewpoint 106. For example, these effects can be produced using a three dimensional surface model and a rendering process.

For reasons of convenience, a computer rendering process may be described in terms of certain physical phenomena, such as a ray of light being reflected off an object and onto a view plane. However, it should be recognized that the actual rendering process implemented in computer code does not necessarily correlate to physical phenomena.

Figure 2:
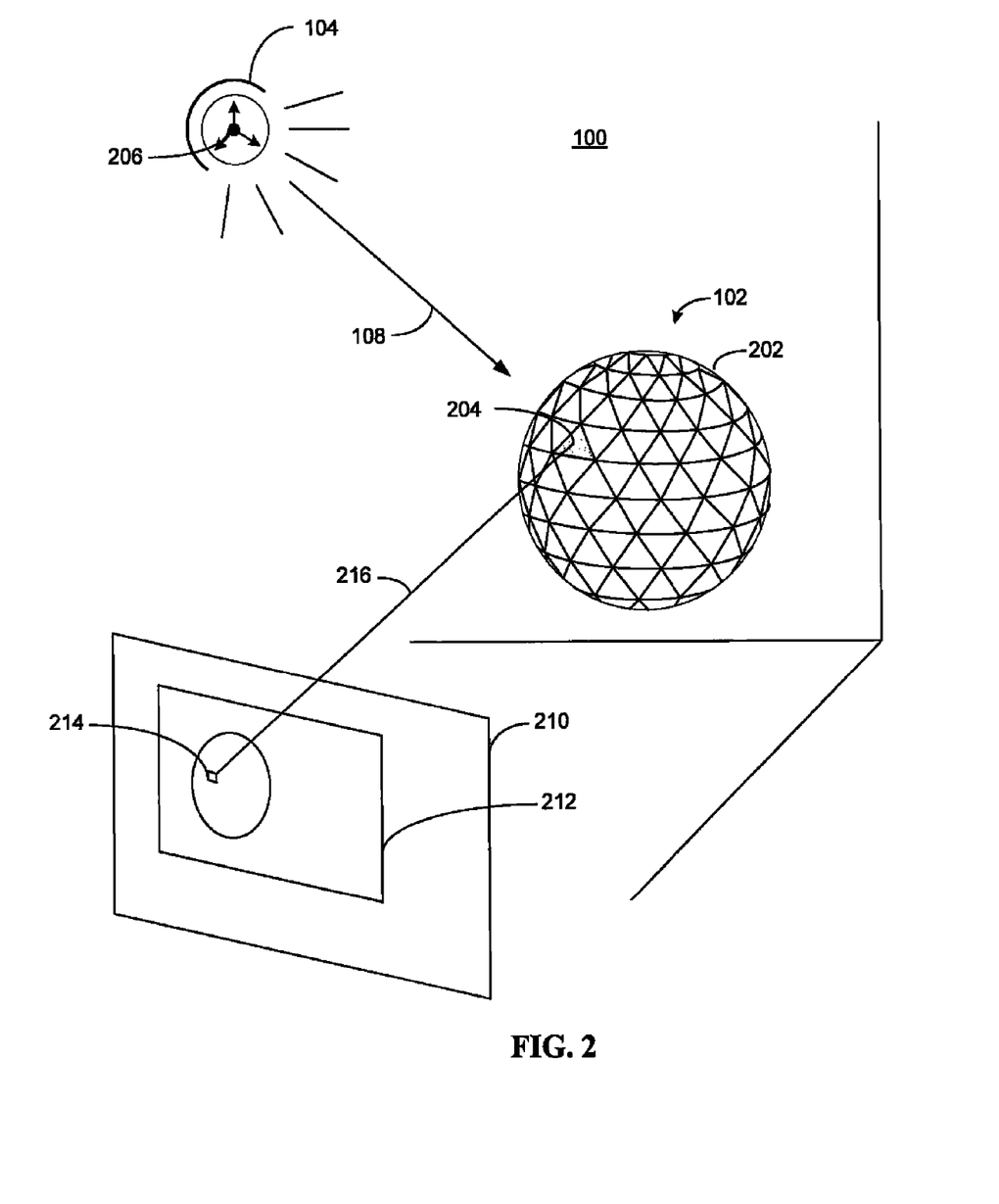

FIG. 2 depicts the surface of object 102 modeled using a mesh 202, which is composed of a series of surface polygons or primitives 204. Various techniques for modeling the surface of object 102 using mesh 202 are well known. For example, points on the surface of object 102 can be defined, then surface polygons or primitives are created using a triangulation process. Each surface polygon or primitive can be defined by at least three points and a normal vector. Various properties, such as color, texture, material type, and the like, can be associated with each surface polygon or primitive.

As depicted in FIG. 2, light source 104 can be represented by an origin point 206 and a spectral component or color value. Various other properties, such as field of view, radiance density, polarity, and the like, can be associated with light source 104. These properties can be defined using lighting parameters, which can be associated with light source 104.

Color values, whether they relate to light source 104 or object 102, are typically defined as a three component color array of a primary color triplet, such as red, green, blue (RGB), or other descriptive color values, such as hue, saturation, value (HSB). The color values stored in the color array can be later interpreted by a display or other visualization device.

RGB values are typically an array of three components representing relative levels of red, blue or green. For example, if defined on a scale from zero (0) to one (1), the color "pure red" may be represented as (1, 0, 0). A darker red color may be represented as (0.75, 0, 0). Because the color components are additive in nature, pure white is represented as (1, 1, 1) and pure black is (0, 0, 0).

HSV values typically include hue, saturation and value components. Hue determines the dominant wavelength of a color. In HSV, hue is a numerical quantity that refers to a position on the color spectrum. The saturation component represents the brilliance or vibrancy of the color's hue. The value component represents the color's brightness. In HSV values, the visible color spectrum is defined along a range of numbers from 0 to 360. For a more complete description of RGB and HSV color values, see George Joblove, Donald Greenberg, *Color Spaces for Computer Graphics,* 12(3) COMPUTER GRAPHICS, 20 (August 1978).

FIG. 2 depicts computer generated scene 100 rendered into a computer generated image 212 using a rendering process. In particular, in the rendering process, scene 100 is projected onto view plane 210 as image 212.

Image 212 can be created by sequentially processing pixels 214 to construct a representation of scene 100 as a bitmap. For example, one exemplary projection scheme can use an orthogonal projection. In particular, for a given pixel 214 in the bitmap, a normal path 216 can be traced originating at the given pixel 214, normal to view plane 210. One or more surface polygons or other primitives 204 on the surface of object 102 corresponding to the given pixel 214 can be found at the intersection of normal path 216 and the surface of object 102. It should be recognized, however, that various types of projection schemes can be used.

Once the one or more surface polygons or primitives 204 corresponding to the given pixel 214 have been found, a shading process can be used to simulate a realistic lighting condition. As described above, various properties, such as color, surface texture, material type, and the like, can be associated with the one or more surface polygons or primitives 204. As also described above, various properties, such as color values, field of view, radiance density, polarity, and the like, can be associated with light source 104. Using these properties, a shader can determine an appropriate color value for the given pixel 214 in the bitmap. In essence, the shader models a light beam's effect on a given surface geometry of object 102 as viewed from view plane 210.

It should be recognized that not every pixel 214 in image 212 has a corresponding surface polygon or primitive 204 on the surface of object 102. In particular, the normal path 216 of a pixel 214 may not intersect with the surface of object 102 if, for example, the pixel 214 corresponds to the background of scene 100.

Figure 3:
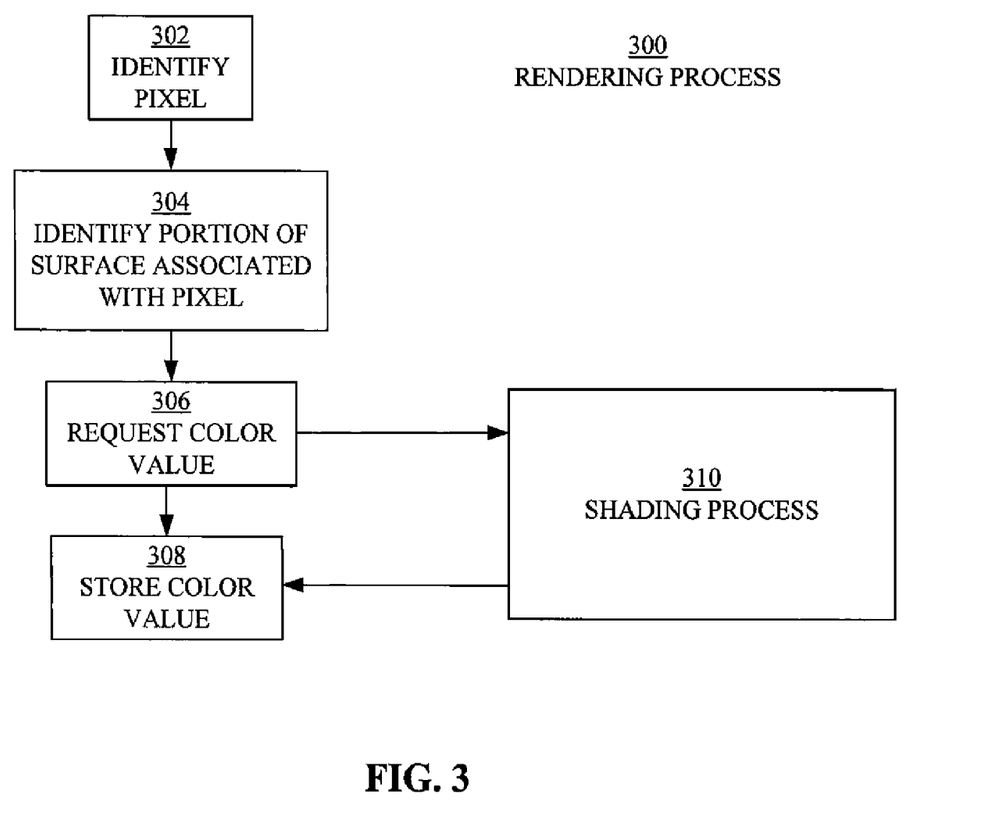
FIG. 3 is a flow diagram illustrating an exemplary rendering process.

FIG. 3 depicts an exemplary rendering process 300. For the sake of clarity and simplicity, exemplary rendering process 300 is described below using a single shading process 310. It should be recognized, however, that multiple shading processes can be used for a given surface polygon.

In step 302, a pixel is identified. The pixel is typically described with respect to its location (n, m) in a larger array or bitmap. In general, the location and size of the pixel identify an area to be shaded in a larger two dimensional image.

In step 304, a portion of the surface of an object associated with the image by the pixel (n, m) is identified. As described above, when the surface of the object is modeled using a mesh of surface polygons or primitives, one or more surface polygons or primitives corresponding to the pixel are identified.

In step 306, a color value for the one or more surface polygon or primitive is requested from shading process 310. Shading process 310 returns a color value, the color value is stored by the rendering process in step 308.

For purposes of clarity and simplicity, the shading process is described as a separate process. However, there may be some embodiments where the shading process 310 is fully integrated into the rendering process 300. A more detailed description of exemplary shading processes are described below with reference to FIGS. 4, 5 and 6.

It should be recognized that rendering process 300 may be repeated for any number of pixels in the bitmap. It should also be recognized that the pixels can be processed in any desired sequence. For example, the pixels may each be processed in a sequential order, such as a raster scan. They may also be processed as part of a smaller update area. The specific method and order of pixel processing is not important to the embodiment described herein.

2. Bidirectional Reflectance Distribution Functions

As described above, one technique for producing a color value is to use a BRDF modeling function. See, Fred E. Nicodemus, *Directional Reflectance and Emissivity of an Opaque Surface,* 4(7) APPLIED OPTICS, 767 (July 1965).

In general terms, a BRDF is a mathematical transform that simulates the complex interaction between a beam of light and a surface. For a given observation point, BRDF inputs include, but may not be limited to, properties associated with a surface (S), properties associated with a simulated light color ($L_C$), and a simulated light position ($L_P$). The BRDF may also be a function of other geometry information (G), such as view angle, radiosity and other properties not relevant to the purposes of this embodiment. Mathematically the function can be described as:

$$BRDF(S, L_C, L_P, G). \tag{1}$$

In some embodiments, properties associated with the surface (S) may include optical characteristics, location, and orientation with respect to the relevant pixel on the view plane. Additionally, a simulated light position ($L_P$) may be represented as a three dimensional coordinate position defining the origin of a simulated beam of light. Lighting parameters associated with a light source in a scene may define a simulated light color ($L_C$) as a multi component color value array (e.g., RGB or HSV values).

BRDF functions exhibit certain properties when applied to most surface simulations. A BRDF function simulates the interaction between a surface polygon and a light source by producing a shaded color value. Producing results congruous with the physical phenomena, a BRDF function will "reflect" or return some color components and "absorb" or not return other color components. Thus, for a given lighting color, the BRDF associated with a surface will produce a reflected color value.

For most surfaces, a BRDF result computed using a colored light source produces the same reflected color value as a BRDF computed using a pure white light source, and then combined with the original light color. In mathematical terms:

$$BRDF(S, \text{white}, L_P, G) * L_C = BRDF(S, L_C, L_P, G). \quad (2)$$

This notable feature of the BRDF function allows a shading process to deal with the reflection simulation and color simulation in separate processing steps, and is exploited in some embodiments described in further detail below.

3. Shading Process

Figure 4:
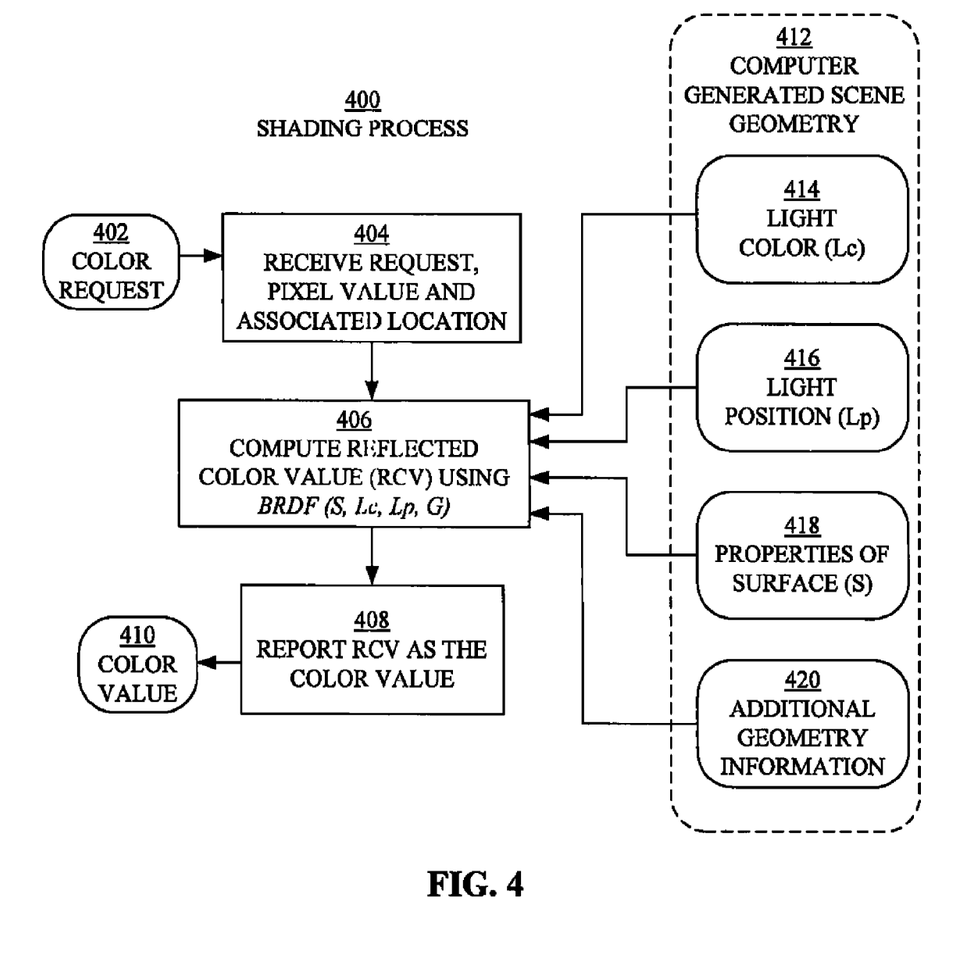
FIG. 4 is a flow diagram illustrating an exemplary shading process.

FIG. 4 illustrates an exemplary embodiment for determining a color value for a given pixel using a shading process 400. In step 404, the shading process 400 receives a color value request 402. In some embodiments, the color value request 402 may indicate a surface polygon or primitive associated with the pixel. In other embodiments, the associated surface polygon or primitive may be identified as part of the shading process.

In step 406, a BRDF is used to obtain a reflected color value (RCV). As described above, the BRDF is a function of the computer generated scene geometry 412, such as simulated light position ($L_P$) 416, simulated light color ($L_C$) 414, properties associated with a surface (S) 418, and additional geometry information (G) 420. Mathematically a shading process to produce a reflected color value (RCV) can be described as:

$$RCV = BRDF(S, L_C, L_P, G). \quad (3)$$

In step 408, the reflected color value (RCV) is reported as color value 410. In some embodiments, color value 410 can be passed to another process, such as a rendering process. As noted earlier, in some embodiments, it is not necessary for the rendering process to be defined as a separate process. Steps shown to belong to either a rendering process or a shading process may be interchangeable without affecting the resulting color value.

4. Tinted Shading Process

Under certain circumstances, the BRDF function may return a small or insignificant color value (i.e., approximately the same color value as for the color black) for the surface of the object. This can occur when the color of the light and the color of the surface are two different saturated primary colors.

For example, in a physical lighting scenario, an object appears a certain color because all other colors are absorbed, converted, or diffracted by the surface of the object. Thus, the visible color is a product of the non-absorbed or reflected colors that reach the eye. For example, if a red surface is illuminated by a blue light, then the red surface will appear to be black because all the blue light, which has little or no red color, is absorbed by the red surface. In this example, a BRDF function will mimic this result and return a small or insignificant color value when a red surface and blue light are used.

This result is common when rendering certain types of computer generated scenes using known rendering techniques. For example, a night scene is typically rendered using lights with a primarily blue hue. As discussed earlier, the blue light simulates a scotopic effect common with low light conditions such as moonlight. However, objects with a primarily red hue will appear black or invisible when lit with a blue light in these scenes because they absorb a large portion of the illuminating light.

Figure 5:
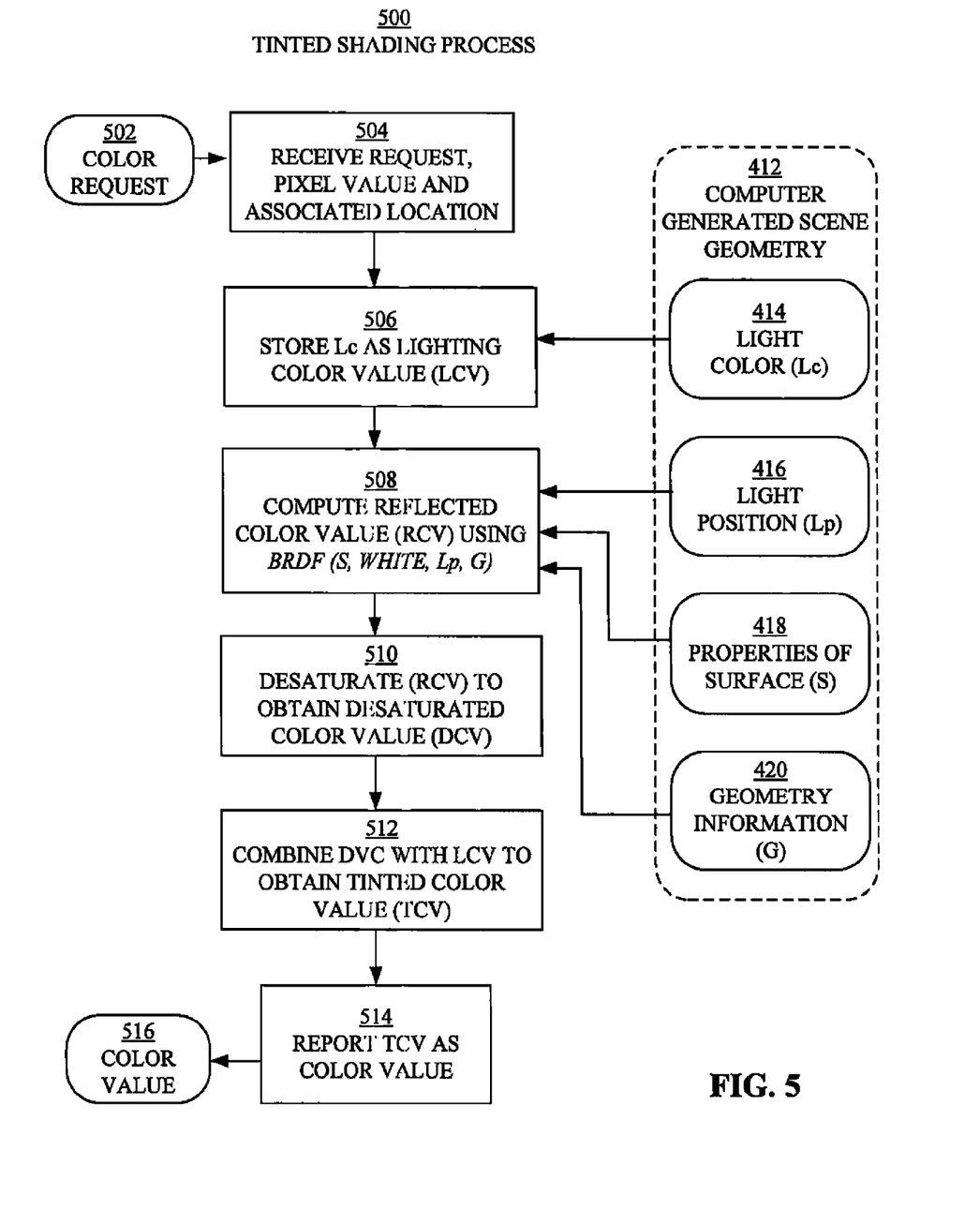
FIG. 5 is a flow diagram illustrating an exemplary tinted shading process.

FIG. 5 depicts an exemplary tinted shading process 500 for producing a tinted light in a scene when a surface is illuminated with a complimentary color.

In step 504, process 500 receives a color value request 502. Process 500 may also receive information about the pixel and the location of the surface polygon or primitive associated with the pixel. In some embodiments, process 500 may determine the associated surface polygon or primitive based on properties of the pixel related to the color value request.

As described above, a simulated light color ($L_C$) 414 can be associated with the light source for a computer generated scene. In step 506, the simulated light color ($L_C$) 414 is stored as the lighting color value (LCV).

In step 508, a reflected color value (RCV) is computed using a BRDF. In the present exemplary embodiment, the RCV is computed using white light color rather than the stored LCV. In addition, various parameters derived from the computer generated scene are used in computing the RCV. These parameters typically include the simulated light position ($L_P$) 416, properties associated with the surface (S) 418, and other geometry information (G) 420. Qualitatively, the resulting reflected color value (RCV) produced by the BRDF simulates a white light incident on the surface of the object. Mathematically the reflected color value (RCV) can be represented as:

$$RCV = BRDF(S, \text{white}, L_P, G). \quad (4)$$

Note, because of the white light incident on the surface, the reflected color value represents a hue related to the color of the surface of the object. Thus, in the present exemplary embodiment, all hue resulting from the RCV is removed and replaced with the hue from the illuminating light source.

In step 510, a desaturation process is applied to the reflected color value (RCV) to produce a desaturated color value (DCV). For example, if the reflected color value is represented as a HSV triplet, the saturation component value (S) would be reduced while preserving the original values of hue (H) and value (V). Qualitatively, this produces a desaturated color value that appears gray but is at an appropriate intensity so that a realistic shading effect is preserved in the final bitmap image. Mathematically, for a given reflected color value (RCV), a desaturated color value (DCV) can be defined as:

$$DCV = \text{desaturate}(RCV). \quad (5)$$

For example, in the context of simulating scotopic effect of a scene in low lighting conditions using blue light, if the color of the surface of the object contains significant non-blue components, using the RCV as the color value could destroy the scotopic effect of the scene. For example, a red surface reflecting red light would appear unnatural in a night scene where a primarily blue light is used to simulate a scoptic effect. Therefore, in the present exemplary embodiment, hues of the reflected color value that match the hues of the surface of the object are removed. For example, red hues are removed from the light reflecting from the red surface to prevent the reflected light from appearing red.

However, a shaded gray object may also appear unnatural in a scene in some circumstances. As discussed earlier, a BRDF for most surfaces can be computed using a white light and later combined with another color to produce a reflected color value representative of a given lighting effect (Equation 3). Thus, in step 512, the desaturated color value (DCV) is combined with the previously stored lighting color value (LCV) to produce a tinted color value (TCV). This restores hue properties associated with the lighting source in order to give the surface of the object the appearance of being illuminated with the original simulated light color ($L_C$). Mathematically, a tinted shading process can be represented as:

$$TCV = L_C * \text{desaturate}(BRDF(S, \text{white}, L_P, G)). \tag{6}$$

In step 514, this tinted color value (TCV) is then reported as the color value 516. As noted earlier, in some embodiments the color value can be used in a rendering process to compute a color value for a pixel in a bitmap.

5. Blended Tint Shading Process

A tinted shading process allows objects in a computer generated scene to reflect more light and improves their visibility under certain lighting conditions. However, because the color of the light has been tinted, its appearance in some scenes may appear unnatural or unrealistic. Thus, in one embodiment, the tinted color value is blended with the result of a more natural reflected light value to allow for variable degrees of surface tinting in a blended tint shading process 600 depicted in FIG. 6.

Figure 6:
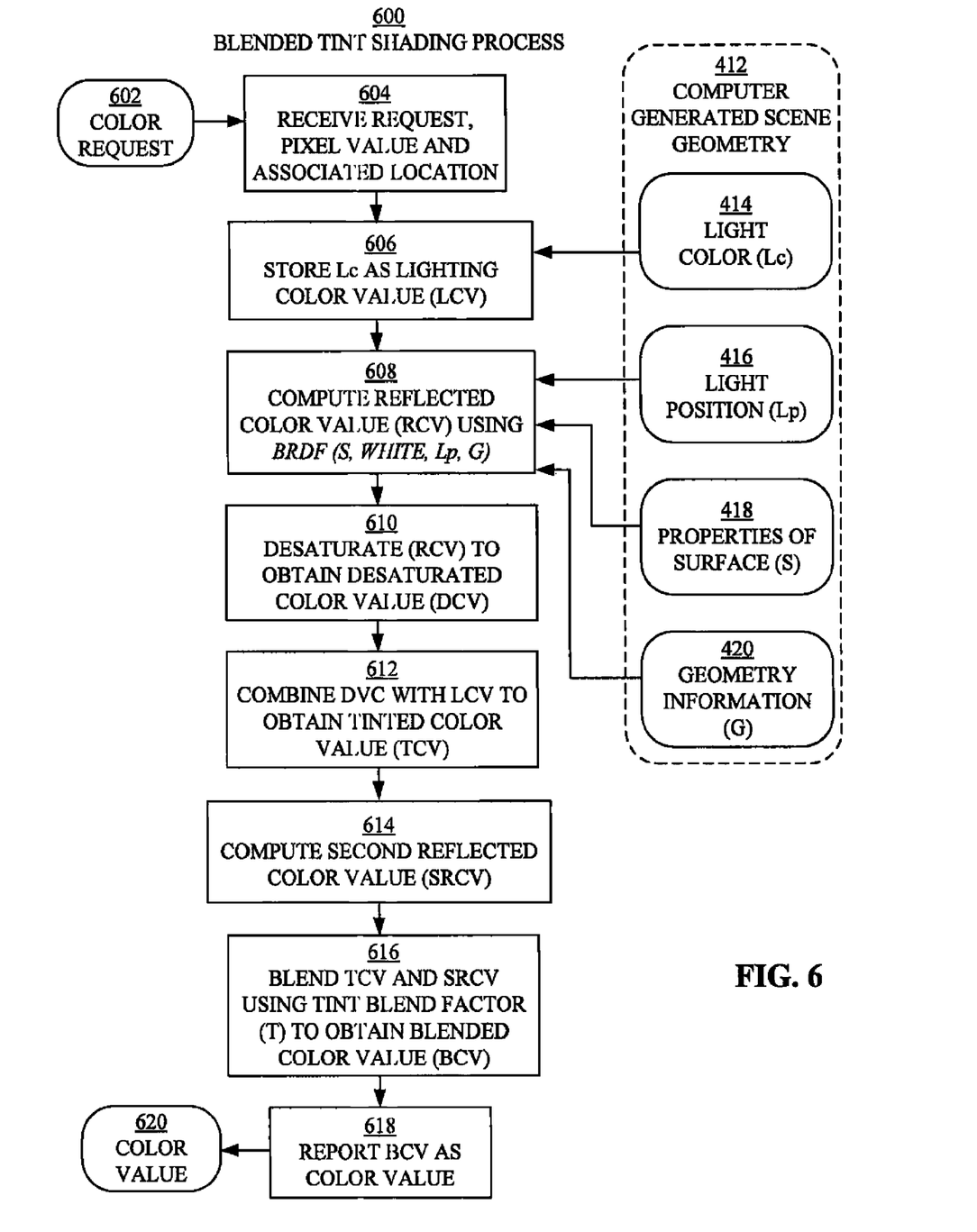
FIG. 6 is a flow diagram illustrating an exemplary blended tint shading process.

In step 604, process 600 receives a color request 602. Process 600 may also receive information about the pixel and the location of the surface polygon associated with the pixel. In some embodiments, process 600 may determine the associated surface polygon or primitive based on properties of the pixel related to the color value request 602.

As described above, a simulated light color ($L_C$) 414 can be associated with the light source. In step 606, simulated light color ($L_C$) 414 is stored as the lighting color value (LCV).

In step 608, a reflected color value (RCV) is computed using a BRDF. In the present exemplary embodiment, the RCV is computed using white light color rather than the stored LCV. In step 610, the reflected color value (RCV) is desaturated to produce a desaturated color value (DCV). In step 612, the desaturated color value (DCV) is then combined with the previously stored lighting color value (LCV) to obtain a tinted color value (TCV). As stated earlier this process can be represented mathematically as equation 6:

$$TCV = L_C * \text{desaturate}(BRDF(S, \text{white}, L_P, G)). \tag{6}$$

In the present exemplary embodiment, in step 614, a second reflected color value (SRCV) is calculated. This second reflected color value (SRCV) exploits aforementioned properties of a BRDF reflection. Recall from equation 2:

$$BRDF(S, \text{white}, L_P, G) * L_C = BRDF(S, L_C, L_P, G). \tag{2}$$

This property allows step 614 to produce a color value identical to the value that would have been produced using the original simulated light color ($L_C$). Note that step 614 produces this color value without having to compute a new BRDF output. Thus, a second lighting color solution can be efficiently produced with minimal computing resources. Mathematically this can be represented as:

$$SRCV = BRDF(S, \text{white}, L_P, G) * L_C. \tag{7}$$

Qualitatively, the second reflected color value (SRCV) may appear more natural because it replicates a light color that would have been produced using the original lighting color.

In step 616, the tinted color value (TCV) and the second reflected color value (SRCV) are combined using a tint blend factor (T). The tint blend factor (T) represents the relative amount of each color value used to produce a blended color value (BCV). For example, in some embodiments, the tint blend factor is defined as a number (T) ranging from 0 to 1.0. The tinted color value (TCV) may be scaled by the blend factor T by multiplying the each color component in the tinted color value array. For example, if the tinted color value is represented by an RGB triplet, each color component will by multiplied by the scaling factor (T). Similarly, the second reflected color value (SRCV) may be scaled by a complimentary factor (1−T).

In step 616, the two scaled color values can then be combined to obtain a blended color value (BCV). Mathematically this is represented as:

$$BCV = (T)*(TCV) + (1-T)*(SRCV). \tag{8}$$

More generally, the blended color value can be represented as:

$$BCV = (T)*(L_C * \text{desaturate}(BRDF(S, \text{white}, L_P, G))) + (1-T)*(BRDF(S, \text{white}, L_P, G)*L_C). \tag{9}$$

In step 618, the blended color value is reported as the color value 620. In some embodiments, this color value many be reported to another process such as an image rendering process.

Process 600 can be coupled with various processes for selecting the tint blend factor (T). In some embodiments, the value (T) may be controlled by a user through a computer input device such as a graphical user interface. In other embodiments the tint blend factor (T) may be controlled automatically by a computer process.

6. Computer System

Figure 7:
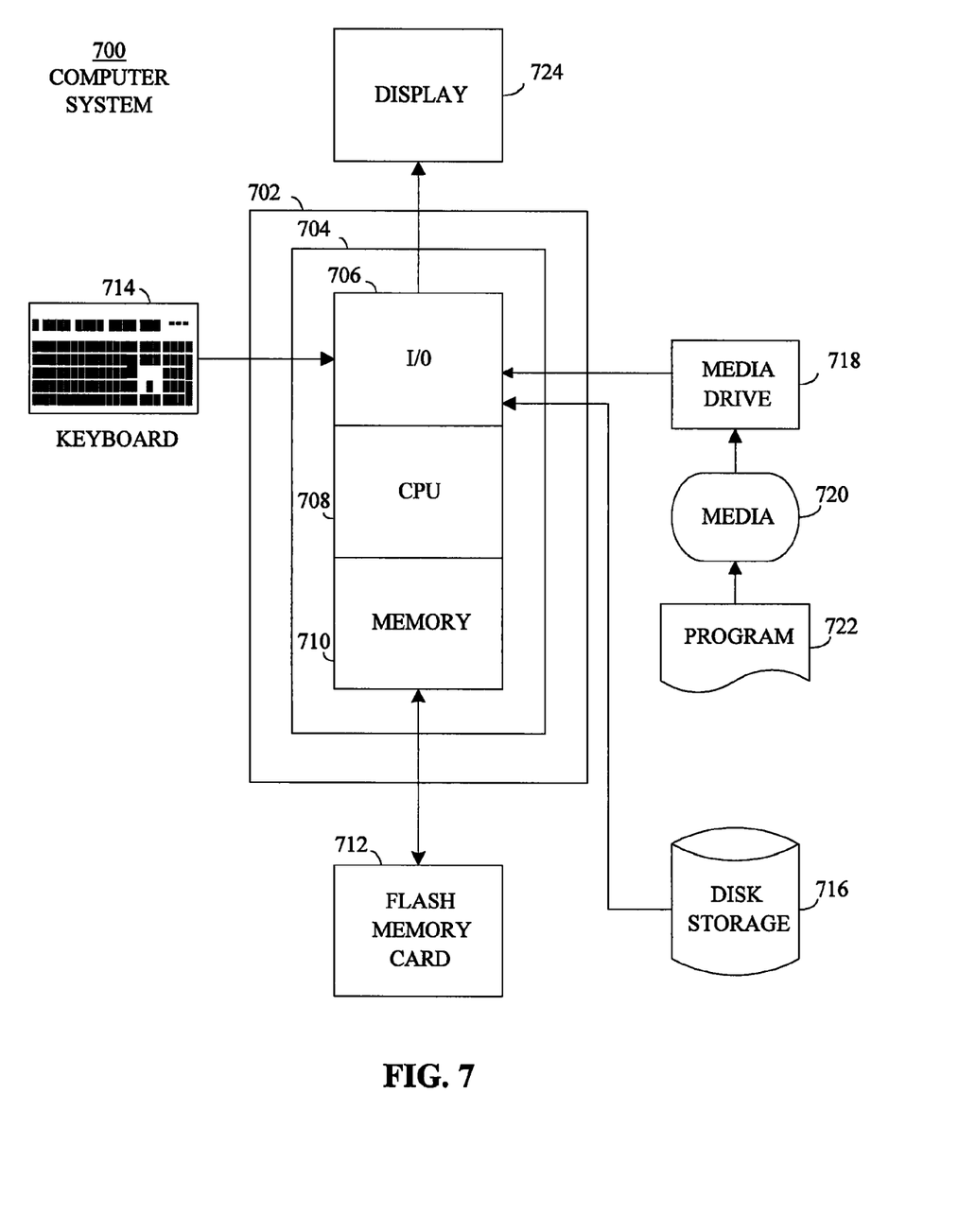
FIG. 7 is a block diagram of an exemplary computer system.

FIG. 7 depicts an exemplary computer system 700 configured to perform any one of the above-described processes. In this context, computer system 700 may be a general-purpose computer including, for example, a processor, memory, storage, and input/output devices (e.g., monitor, keyboard, disk drive, Internet connection, etc.). However, computer system 700 may include circuitry or other specialized hardware for carrying out some or all aspects of the processes. In some operational settings, computer system 700 may be configured as a system that includes one or more units, each of which is configured to carry out some aspects of the processes either in software, in hardware or in some combination thereof.

FIG. 7 depicts computer system 700 with a number of standard components that may be used to perform the above-described processes. The main system 702 includes a motherboard 704 having an input/output ("I/O") section 706, one or more central processing units ("CPU") 708, and a memory section 710, which may have a flash memory card 712 related to it. The I/O section 706 is connected to a display 724, a keyboard 714, a disk storage unit 716 and a media drive unit 718. The media drive unit 718 can read a computer-readable medium 720, which typically contains programs 722 and data.

At least some values based on the results of the above-described processes can be saved for subsequent use. For example the outputs of the system, including the rendering process 300, shading process 400, tinted shading process 500, and the blended tint shading process 600, can be saved directly for application as in memory (e.g., RAM (Random Access Memory)) or other form of disk storage 716. Alternatively, some derivative or summary form of the results (e.g., averages, combinations, blending results, etc.) can be saved for later use according to the requirements of the operational setting.

Additionally, a computer-readable medium can be used to store (e.g., tangibly embody) one or more computer programs for performing any one of the above-described processes by means of a computer. The computer program may be written, for example, in a general-purpose programming language (e.g., Pascal, C, C++) or some specialized application-specific language.

Although only certain exemplary embodiments of this invention have been described in detail above, those skilled in the art will readily appreciate that many modifications are possible in the exemplary embodiments without materially departing from the novel teachings and advantages of this invention. For example, aspects of embodiments disclosed above can be combined in other combinations to form additional embodiments. Accordingly, all such modifications are intended to be included within the scope of this invention.

We claim:

1. A computer-implemented method for producing a tinted color value for a surface of an object in a computer generated scene, the surface being illuminated by a light source having a lighting color value associated with the light source, the method comprising:
    computing, using a processor, a first reflected color value for the surface, wherein the first reflected color value is calculated using a bidirectional reflectance distribution function, wherein the first reflected color value is calculated based on an illumination light having a white lighting color value rather than the lighting color value associated with the light source, wherein the lighting color value represents a color other than the white lighting color;
    computing, using the processor, a desaturated color value using the first reflected color value;
    computing, using the processor, a tinted color value by combining the desaturated color value with the lighting color value associated with the light source; and
    storing the tinted color value.

2. The computer-implemented method of claim 1, wherein the lighting color value represents a blue color.

3. The computer-implemented method of claim 1, wherein computing a desaturated color value includes reducing a saturation value associated with the first reflected color value.

4. The computer-implemented method of claim 1 further comprising:
    computing a second reflected color value by combining the first reflected color value with the lighting color value associated with the light source; and
    storing the second reflected color value.

5. The computer-implemented method of claim 4 further comprising:
    defining a blend factor value; and
    computing a blended color value as a sum of the tinted color value and the second reflected color value, wherein the blend factor value apportions between the tinted color value and the second reflected color value in calculating the sum.

6. A non-transitory computer-readable storage medium having computer-executable instructions for producing a tinted color value for a surface of an object in a computer generated scene, the surface being illuminated by a light source having a lighting color value associated with the light source, comprising instructions for:
    computing a first reflected color value for the surface, wherein the first reflected color value is calculated using a bidirectional reflectance distribution function, wherein the first reflected color value is calculated based on an illumination light having a white lighting color value rather than the lighting color value associated with the light source, wherein the lighting color value represents a color other than the white lighting color;
    computing a desaturated color value using the first reflected color value;
    computing a tinted color value by combining the desaturated color value with the lighting color value associated with the light source; and
    storing the tinted color value.

7. The non-transitory computer-readable storage medium of claim 6, wherein the lighting color value represents a blue color.

8. The non-transitory computer-readable storage medium of claim 6, wherein computing a desaturated color value includes reducing a saturation value associated with the first reflected color value.

9. The non-transitory computer-readable storage medium of claim 6 further comprising instructions for:
    computing a second reflected color value by combining the first reflected color value with the lighting color value associated with the light source; and
    storing the second reflected color value.

10. The non-transitory computer-readable storage medium of claim 9 further comprising instructions for:
    defining a blend factor value; and
    computing a blended color value as a sum of the tinted color value and the second reflected color value, wherein the blend factor value apportions between the tinted color value and the second reflected color value in calculating the sum.

11. A system for producing a tinted color value for a surface of an object in a computer generated scene, the surface being illuminated by a light source having a lighting color value associated with the light source, comprising:
    a memory configured to store the lighting color value; and
    a non-transitory computer-readable storage medium having computer-executable instructions for:
    computing a first reflected color value for the surface, wherein the first reflected color value is calculated using a bidirectional reflectance distribution function, wherein the first reflected color value is calculated based on an illumination light having a white lighting color value rather than the lighting color value associated with the light source, wherein the lighting color value represents a color other than the white lighting color;
    computing a desaturated color value using the first reflected color value;
    computing a tinted color value by combining the desaturated color value with the lighting color value associated with the light source; and
    storing the tinted color value on the memory.

* * * * *

UNITED STATES PATENT AND TRADEMARK OFFICE
CERTIFICATE OF CORRECTION

| | | |
|---|---|---|
| PATENT NO. | : 8,310,483 B2 | Page 1 of 1 |
| APPLICATION NO. | : 11/943415 | |
| DATED | : November 13, 2012 | |
| INVENTOR(S) | : Douglas W. Cooper et al. | |

It is certified that error appears in the above-identified patent and that said Letters Patent is hereby corrected as shown below:

In column 6, line 64, Delete "scoptic" and insert -- scotopic --, therefor.

Signed and Sealed this
Twenty-sixth Day of February, 2013

Teresa Stanek Rea
*Acting Director of the United States Patent and Trademark Office*